United States Patent
Bartelt et al.

[11] Patent Number: 5,554,284
[45] Date of Patent: Sep. 10, 1996

[54] BACKWASHABLE FILTER FOR FLUIDS

[75] Inventors: Bertram Bartelt, Steinheim; Peter Gohle, Ludwigsburg; Wolfgang Schaal, Backnang, all of Germany

[73] Assignee: Filterwerk Mann & Hummel GmbH, Ludwigsburg, Germany

[21] Appl. No.: 371,538

[22] Filed: Jan. 11, 1995

[30] Foreign Application Priority Data

Jan. 11, 1994 [DE] Germany ............................ 44 00 485.0

[51] Int. Cl.⁶ .......................... B01D 33/073; B01D 33/46; B01D 33/50
[52] U.S. Cl. .......................... 210/356; 210/392; 210/393; 210/396; 210/402; 210/411
[58] Field of Search ........................ 210/396, 397, 210/408, 411, 412, 413, 414, 402, 354, 356, 391, 392, 393, 406

[56] References Cited

U.S. PATENT DOCUMENTS

| | | | |
|---|---|---|---|
| 1,512,977 | 10/1924 | Depue | 210/392 |
| 1,914,742 | 6/1933 | Hillier | 210/393 |
| 2,167,322 | 7/1939 | Cuno et al. | 210/392 |
| 2,242,861 | 5/1941 | Keene | 210/396 |
| 2,332,917 | 10/1943 | Jordan et al. | 210/411 |
| 3,333,700 | 8/1967 | Coleman | 210/393 |
| 3,363,771 | 1/1968 | Walters | 210/391 |
| 4,818,402 | 4/1989 | Steiner et al. | 210/411 |
| 5,051,195 | 9/1991 | Haapamaki et al. | 210/396 |
| 5,183,568 | 2/1993 | Lescovich | 210/396 |
| 5,423,977 | 6/1995 | Aoki et al. | 210/391 |

FOREIGN PATENT DOCUMENTS

| | | |
|---|---|---|
| 49746 | 12/1983 | European Pat. Off. |
| 3209216 | 9/1983 | Germany |
| 9209856.8 | 11/1992 | Germany |
| 4222495 | 1/1994 | Germany |

*Primary Examiner*—Cynthia L. Nessler
*Attorney, Agent, or Firm*—Evenson, McKeown, Edwards & Lenahan

[57] ABSTRACT

A backwashable fluid filter formed with a filter element which is disposed so that it can be rotated about its axis inside the filter housing by a drive mechanism and through which a radial flow passes. A backwashing device is provided which includes a dirt removal channel which extends parallel to the axis of the filter element. When the filter element is backwashed, clean fluid flows back through the filter element, removes dirt particles adhering to the filter element and carries them into the dirt removal channel. In order to pre-clean the filter element, a resiliently mounted stripping device is arranged in front of the backwashing device to remove coarse dirt from the surface of the filter element before it reaches the backwashing device. The filter element is provided with slit-like openings, each of which has a substantially U-shaped configuration and defines a resilient tongue. During backwashing, these resilient tongues have the advantage that they can move out of their normal positions to expand the width of the slit-like openings and facilitate effective cleaning of filter element.

16 Claims, 5 Drawing Sheets

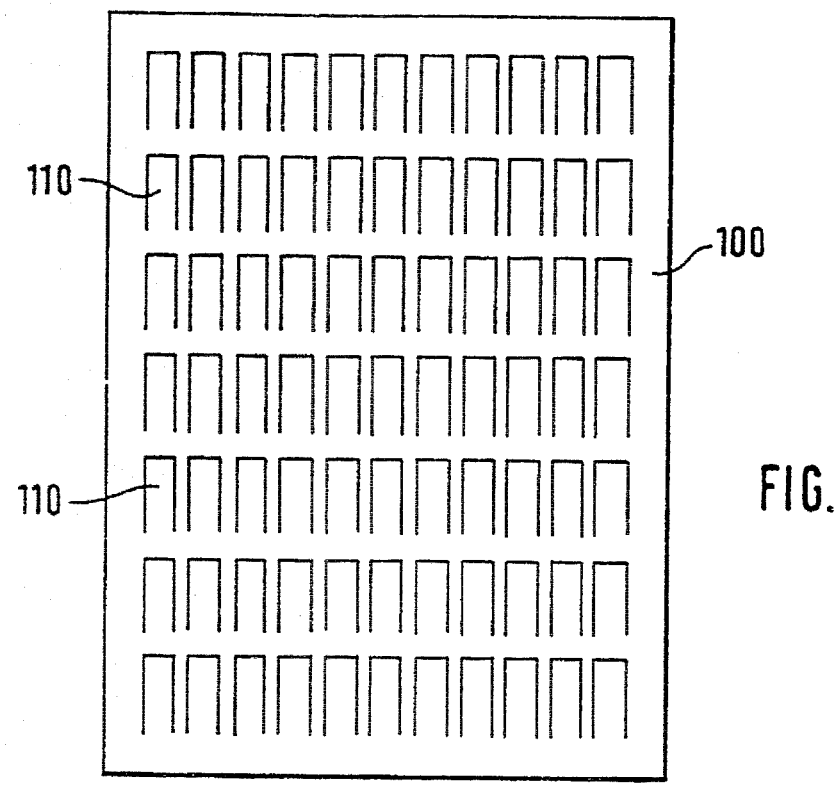
FIG. 1
FIG. 1a
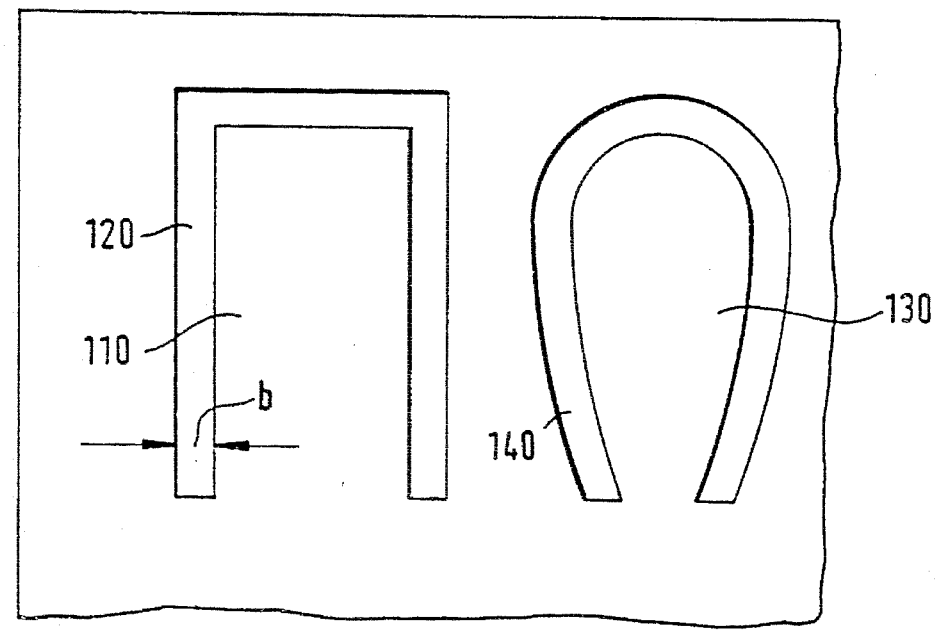

BACKWASHABLE FILTER FOR FLUIDS

BACKGROUND OF THE INVENTION

This invention relates to a backwashable filter, particularly for liquids, comprising a hollow-cylindrical filter element which can be rotated about its axis, through which a radial flow passes and which separates a filtrate chamber from a dirty-liquid chamber inside a filter housing, the filter being provided with a drive mechanism to rotate the cylindrical filter element about its axis and with a stationary backwashing device comprising a dirt removal channel arranged parallel to the axis of the filter element and leading to a dirt discharge conduit.

Mueller et al., German Patent No. DE-PS 3,209,216 discloses a liquid filter which is backwashable in sections and in which a hollow-cylindrical filter element is provided. This filter element separates a filtrate chamber inside a filter housing from a dirty-liquid chamber. The liquid filter also comprises a dirt removal channel which is arranged parallel to the axis of the filter element and has a U-shaped cross-section.

In order to clean the surface of the liquid filter, the filter is rotated about its axis and the dirt removal channel opened up so that, due to the pressure which prevails in the interior of the hollow-cylindrical filter element, liquid flows through the filter material arranged on the surface of the filter element. Dirt particles adhering to the filter material are carried along by the flow and are discharged through a dirt removal channel.

Normally, the size of the particles contained in the liquid to be cleaned cannot be precisely defined. Thus, under certain circumstances, particles may also be deposited which have diameters larger than the gap width of the filter. The cleaning away of such particles by means of the known backwashing device is made more difficult by the fact that, on the one hand, this backwashing device has a U-shaped cross-section which is as closed as possible and is open only to the filter area, but that, on the other hand, larger particles on the circumference of the filter element must also enter the dirt removal channel. As a result, there is a considerable gap at the front edge of the dirt removal groove through which liquid from the dirty-liquid chamber enters the dirt removal channel. This significantly reduces the backwashing effect on the filter element.

Boemer et al., Published European Patent Application No. EP 49,746 discloses an edge filter for lubricating oil which is provided with a cleaning element. The cleaning element has a rinsing duct and, on the one hand, has openings which face the filter surface for backwashing the edge filter as well as an inlet throat for precleaning the filter surface. By the use of this cleaning element, coarse dirt is to be removed by means of the inlet throat and the dirt deposited in the filter gaps is to be removed via the backwashing openings.

A disadvantage of this system is that, due to the arrangement of the inlet throat for coarse dirt, the backwashing effect is severely diminished.

Although the cleaning element represents a compact combination, it has the disadvantage that dirt of varying composition cannot be removed effectively. Thus, on the one hand, the inlet throat must be kept as small as possible in order to not unnecessarily influence the backwashing effect. But, on the other hand, a smaller inlet throat has the disadvantage that coarse dirt will deposit in front of the cleaning gap and cannot be carried away.

The low backwashing effect of the cleaning element is further reduced by the fact that a very wide circumferential area of the filter is backwashed and the velocity of the backwashing flow is therefore greatly reduced.

SUMMARY OF THE INVENTION

It is therefore the object of the invention to provide a backwashable filter which avoids the foregoing disadvantages and in which sectors of the filter are cleaned in a highly efficient manner.

These and other objects of the invention are achieved by providing a backwashable fluid filter comprising a hollow-cylindrical filter element which can be rotated about its axis, through which a radial flow passes and which separates a filtrate chamber from a dirty-fluid chamber inside a filter housing, the filter being provided with a drive mechanism to rotate the cylindrical filter element about its axis and a stationary backwashing device arranged parallel to the axis of the filter element and comprising a dirt removal channel, the dirt removal channel being connected via a shut-off valve to a dirt discharge conduit, the filter element comprising a plate provided with slit-shaped openings, a resiliently mounted stripping device being arranged in front of the backwashing device for removing dirt situated on the surface of the filter element, and the dirt removal channel being provided with at least one opening which opens toward the surface of the filter element through which backwashing fluid can enter the dirt removal channel.

A principal advantage of the invention is that a two-stage cleaning of the surface of the filter element will take place. First, coarse surface dirt is cleaned away from the surface by means of a stripping device which is resiliently mounted in front of the backwashing device. This assures that the dirt removal channel can rest directly against the filter element so that no bypass gap for the dirty fluid will be formed. The remaining dirt which adheres to the filter element, primarily in the very fine filter openings, can then be carried through an opening into the dirt removal channel by means of the backwashing fluid. Naturally, a small opening particularly has the advantage that only little backwashing fluid is required to backwash the filter element.

In addition, a high velocity of the backwashing flow is generated and thus a better cleaning effect is achieved as a result of the higher kinetic energy.

Efficient cleaning is also facilitated by the fact that the slit-shaped openings enlarge as a result of the backwashing pressure so that dirt particles which have deposited at the opening, i.e. in the slit-shaped openings, may be removed. This new type of filter body therefore has the advantage that even stubbornly adhering dirt or dirt deposited in the opening can be removed without any difficulty. Naturally, in addition to liquids, the filter according to the invention is also capable of cleaning air or gases. In particular, because of the possibility of achieving very small filter gap widths, the filter can advantageously be used for removing dust from the air.

In accordance with one embodiment of the invention, the opening to the surface of the filter element comprises a slot which extends the entire length of the filter element parallel to the axis of the filter element. The width of the slot controls the amount of backwashing fluid required. Because of the pre-cleaning by the stripper device, the width of the slot can be chosen to be very narrow.

In a further embodiment, the slot is mounted by means of supports at the rear of the dirt removal channel, i.e. at the side of the channel passed by the rotating filter element after it passes over the slot which leads into the channel. These supports prevent a deforming of the dirt removal channel from being deformed in the area of the slot.

An alternative embodiment of the opening to the surface of the filter element envisions a plurality of slots which are arranged in an offset manner in the circumferential direction and which also extend parallel to the axis of the filter element. This offset arrangement of slots achieves a stable contact surface between the filter element and the dirt removal channel.

In accordance with another embodiment of the invention, the stripping device, which is positioned in front of the slot, comprises a sheet of spring steel having a contact surface which extends along the surface of the filter element parallel to the axis of the filter element. This sheet of spring steel may be provided with a blade. The blade serves to shear off fibers or dirt particles which adhere firmly to the surface of the filter element.

In an alternative embodiment to the sheet of spring steel, the stripping device is a wedge-shaped element which is integrated directly into the backwashing device. In this case, the backwashing device is advantageously resiliently mounted in the radial direction. By means of a spring, a force is exerted on the stripping device in the direction of the filter element. This resilient mounting of the backwashing device additionally effectively prevents dirty liquid from flowing into the dirt removal channel through a gap between the backwashing device and the surface of the filter element.

Another advantage of the invention is that the slit-like openings can be formed in a simple and economical manner. In addition, these slit-shaped openings may be constructed to be tapered; i.e. the slit width may expand in the direction of the filtrate chamber. This effectively counters the danger of the slots becoming clogged by dirt particles, and the nozzle-like configuration of the slots significantly improves cleaning.

The advantage of the invention in accordance with another embodiment is that the filter body is now provided with elements which, on the one hand, exhibit a certain gap width during the filtering of liquid, and on the other hand, this gap is enlarged by the backwashing pressure so that dirt particles, which have deposited on the slit or at the slit-shaped openings, are readily removed.

In accordance with another embodiment of the invention, it is proposed that the width of the resilient tongue be designed such that the length of the slit-like opening is as large as possible, and the resilient tongue at the same time has a low spring constant. This is achieved by decreasing the width of the resilient tongue toward the root end of the tongue.

In accordance with a particularly advantageous process for manufacturing the filter body, the slit-shaped openings are cut out of the filter body by means of a laser beam. Naturally, other manufacturing processes are also conceivable, such as the punching-out or etching out the slot-shaped openings.

The resilient tongues may advantageously be supported by means of a wire coil or winding with the filter plate resting against this wire winding. It is also possible to use a supporting basket or a perforated plate for supporting the resilient tongues.

An advantageous process for backwashing a filter in accordance with the invention comprises providing a fluid filter comprising a filter element which divides a filtrate chamber from a dirty-fluid chamber in a filter housing, the filter element comprising a plate provided with slit-shaped openings, and the slit-shaped openings each having a substantially U-shaped configuration and defining a resilient tongue; and forcing fluid from the filtrate chamber through the filter element into said dirty-fluid chamber, thereby displacing the resilient tongues toward the dirty-fluid chamber and enlarging the slit-shaped openings of the filter element. Thus, cleaning occurs in that a pressure exists in the dirt removal channel which is lower than the pressure in the filtrate chamber. As a result, the resilient tongues move from their normal position toward the dirt removal channel and thereby enlarge the slit-shaped openings. The clean liquid from the filtrate chamber which passes through the filter element and into the dirt removal channel washes the dirt particles out of the slit-shaped openings. As filter element continues to rotate, the back edge of the backwashing device returns the resilient tongues to their normal position.

These and other features of preferred further embodiments of the invention, in addition to being set forth in the claims, are also described in the specification and depicted in the drawings, and in carrying out the invention individual features may each be implemented alone or in the form of subcombinations of two or more features and may be applied to other fields of use and may represent advantageous embodiments as well as embodiments that can be protected separately for which protection is claimed here.

BRIEF DESCRIPTION OF THE DRAWINGS

The invention will be described in further detail hereinafter with reference to illustrative preferred embodiments depicted in the accompanying drawings in which:

FIGS. 1 and 1a are illustrations of effective resilient filter tongues according to the invention;

DETAILED DESCRIPTION OF PREFERRED EMBODIMENTS

Figure 2:
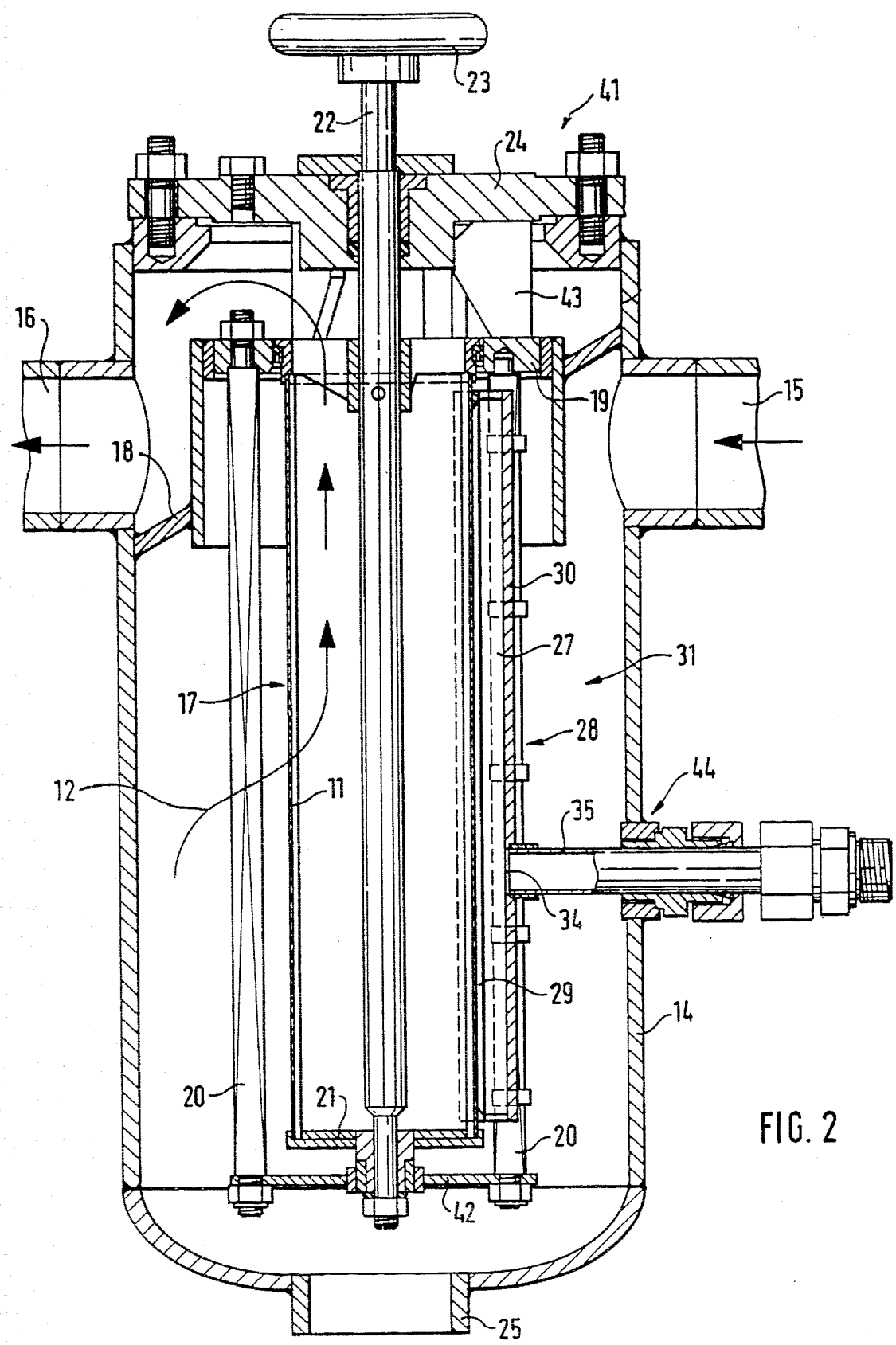
FIG. 2 is a sectional view of a liquid filter and the construction of a filter element according to the invention.

Gap-type filters are suitable for filtering extremely dirty fluids of all types. They are used for filtering lubricating oil and fuel in medium to large internal-combustion engines, and in vapor engines, water power engines, pumps, hydraulic systems, machine tools and transmissions. These filters are also utilized to clean water and liquids from chemical processes as well as in the processing of cooling lubricants. Gap-type filters are normally used in the main flow; that is to say, all of the fluid to be cleaned is passed through the filter. The flow passes through the filter elements from the outside to the inside. The degree of filtration is determined by the gap widths. At gap widths of < 50 μm, it is no longer possible with solidly adhering dirt to clean the gaps despite partial backwashing.

According to FIG. 1, a filter element comprises a thin metal plate 100. This metal plate is provided with a plurality of resilient tongues 110, there being a slit-like opening surrounding three sides of each resilient tongue.

FIG. 1a is an enlarged representation of such a resilient tongue 110. The width b of the slit-shaped opening 120 determines the fineness of the filter or the degree of filtration of the filter unit. A variant of a resilient tongue is also shown in FIG. 1a. Resilient tongue 130 is designed such that its width decreases from the free tip end toward the root end of the tongue. Resilient tongue 130 is also surrounded on three sides by a slit-like opening 140. The slit-shaped openings, and consequently the resilient tongues, are produced, for example, by etching or by cutting by means of a laser beam.

In a liquid filter, as shown in FIG. 2, the filter element is attached to a supporting basket or on supporting rods 10. The dirty liquid flows from the outside in the direction of the arrow 12. The dirt particles are deposited on the surface of the filter element 11. The cleaned liquid is discharged through the interior of the filter.

In order to clean the surface of the filter, the entire filter element is rotatably mounted in a housing. When the filter element is rotated, a stationarily arranged stripping device 37 and 38 removes the dirt particles to the extent that it can get hold of them. However, particularly the dirt particles whose size corresponds approximately to the gap width will remain caught in the gap. In addition, chips or fibers, which have partially passed through the gap, are sheared off in the gap plane. A portion of these chips or fibers will also remain in the gap.

These dirt particles in the gap are removed by the backwashing of the filter. The backwashing is accomplished by passing cleaned liquid back through the gap in the reverse flow direction and in the process picking up the remaining dirt particles and carrying them into a dirt removal channel.

FIG. 2 is a sectional view of the overall construction of a gap-type tube filter. A filter housing 14 has an inlet 15 for the liquid to be cleaned as well as an outlet 16. A filter unit 31 is disposed between the inlet and the outlet.

The filter unit 31 comprises a filter element 11 which is provided with a profiled-wire coil or winding as a supporting element 10, shown only schematically. The filter element is fastened to a filter head 19, 43, 24. The filter head first comprises a carrier element 43 on which a supporting disk 19 is disposed. On the supporting disk 19, studs 20 are arranged which carry a bearing disk 42 on the lower end. The above-mentioned elements are arranged in a stationary manner. The filter element 17 is arranged so that it can be rotated in the overall filter unit 31, a carrier disk being fastened on a shaft 22. This carrier disk rests in a sealing manner against the supporting disk 19. At the opposite end from the carrier disk, a cover disk 21 is fitted onto the shaft 22. The filter element 17 is arranged between the carrier disk and the cover disk 21.

The closure plate 24 has a liquid-tight opening for the shaft 22. This shaft together with the handwheel 23 is used as a manual drive mechanism for rotating the filter element 17. The closure plate 24 is fastened to the filter housing 14 by means of threaded connections (shown here only schematically) and seals off the top opening of the filter housing.

At the lower end of the filter housing 14, there is a dirty-liquid outlet 25 which is provided with a valve (not shown). This dirty-liquid outlet 25 serves to discharge the coarse dirt particles which settle on the bottom of the filter housing 14.

A backwashing device 28 comprises a dirt removal channel 27 which extends along the entire effective length of the filter element 17. On the side facing the surface of the filter element 17, the dirt removal channel 27 has a slot 29 through which the backwashed dirt and the backwashing liquid pass into the dirt removal channel 27.

The backwashing device 28 is provided with a rear wall 30. In this wall, there is an opening 34 adjacent which an outlet conduit 35 is provided for discharging the backwashing liquid. This outlet conduit 35 extends through a liquid-tight wall opening 44 in the filter housing 14.

The filter element 17 may be turned by means of the handwheel 23. Instead of the handwheel, a motorized drive, a pneumatic or hydraulic drive or a ratchet may be used. When the outlet pipe 35 is opened, the entire circumferential surface of the filter element will be cleaned.

Figure 3:
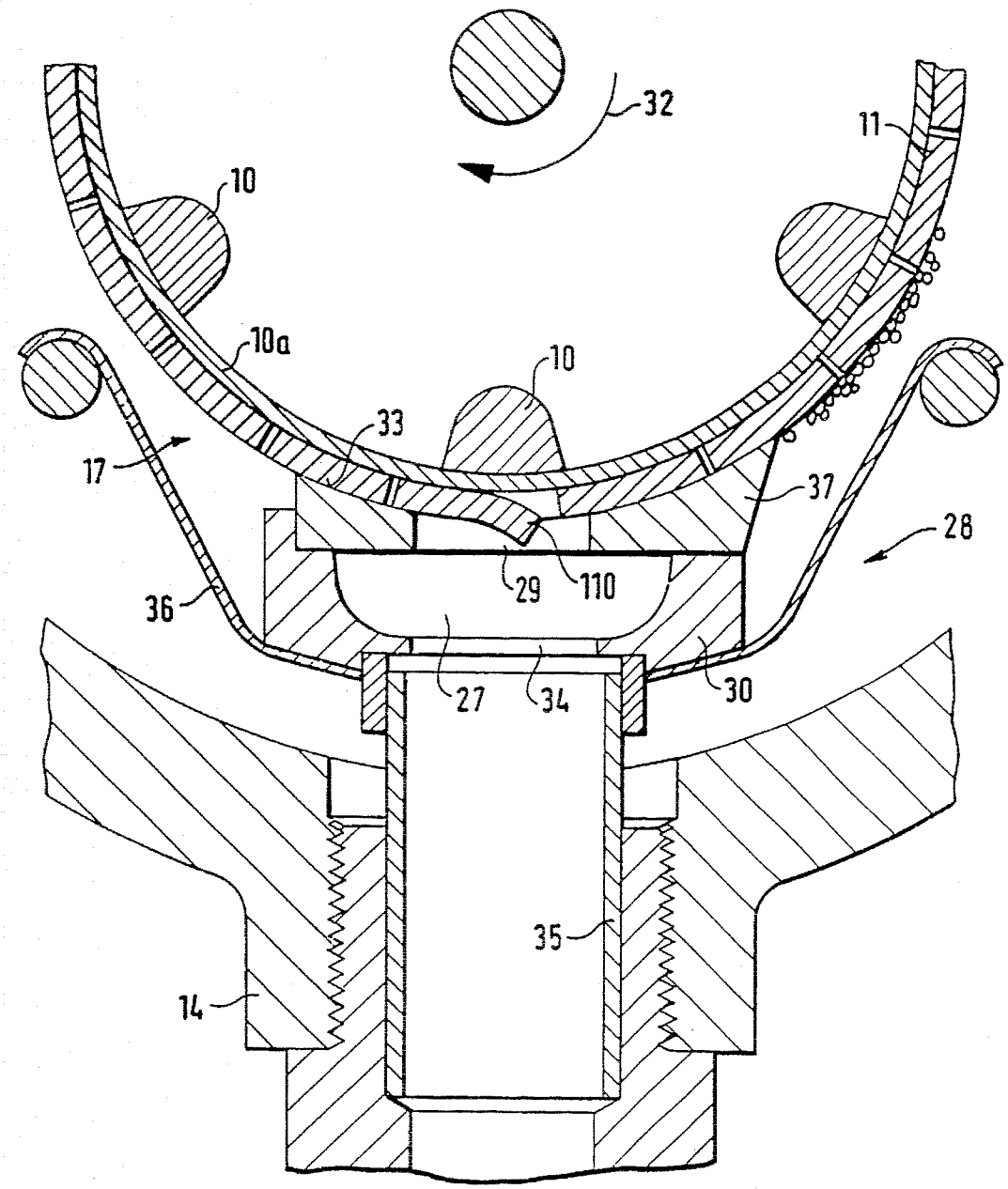
FIG. 3 is a detail view of a backwashing device.

FIG. 3 shows a sectional view of a backwashing device. This figure shows the filter plate 11 as well as the supporting rods 10 of the filter element. The filter element can be rotated in the direction of arrow 32. The backwashing device 28 has a front wall 33 which matingly conforms with the surface of the filter element 17 and in which the slot 29 is situated.

The dirt removal channel 27 is enclosed by rear wall 30 which is simultaneously constructed as the housing. In this rear wall, there is an opening 34 through which the dirt is conducted into the discharge conduit 35. The discharge conduit extends directly through the wall of the filter housing 14 to the outside.

The backwashing device is mounted on the discharge conduit 35 in an axially movable manner. A plurality of springs 36, which are arranged in succession along the axial length of the dirt removal channel 27, exert a force upon the backwashing device 28 in the direction of the filter element 17 so that a gap-free, and consequently liquid-tight, contact is assured between the front face 33 and the filter element 17.

At the front of the backwashing device 28 there is a wedge-shaped blade 37. When the filter element 17 is rotated in the direction of arrow 32, this blade 37 assures that dirt, which adheres to the surface of the filter element, is removed. This dirt settles on the bottom of the filter housing and can be removed from time to time through dirty-liquid outlet 25. The discharge conduit 35 is provided with a valve (not shown). As soon as the valve is opened up, the cleaned liquid situated in the filter element will flow through the opening 29 into the dirt removal channel 27 and from thence through the discharge conduit 35 to a dirt collecting receptacle (not shown).

This cleaning of the surface of the filter element and the simultaneous backwashing may take place continuously during the filtering operation, or it may also occur at predetermined time intervals. The need for cleaning depends on the amount and type of dirt which exists in the system. Thus, for example, very fine dirt may require continuous backwashing of the filter element. If the dirt is relatively coarse in comparison to the gap width of the filter openings, then it may be sufficient to clean the filter by means of the blade 37 and backwash the filter only occasionally.

Figure 4:
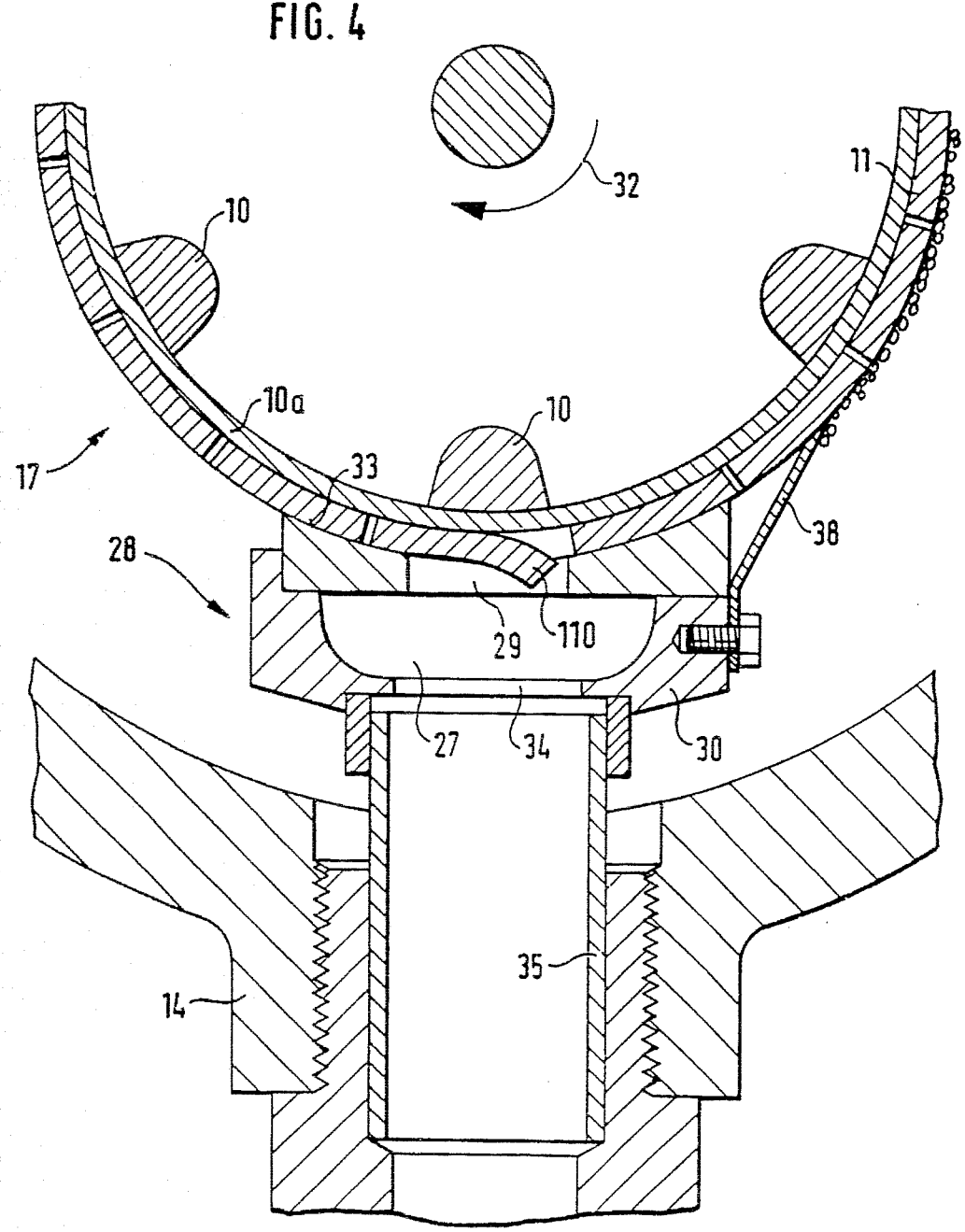
FIG. 4 is a detail view of an alternative backwashing device construction.

FIG. 4 illustrates a variant of the backwashing device shown in FIG. 3. Instead of a blade 37, a stripping device 38 is attached to the wall 30 of dirt removal channel 27. This stripping device comprises, for example, of a sheet of spring steel and is constructed in the shape of a blade at its end facing the filter element. The stripping device 38 is resiliently biased against the surface of the filter element and therefore takes over the coarse cleaning of the surface. Springs, as shown in FIG. 3, are not required in this embodiment because a secure contact between the backwashing device and the filter element 17 can be achieved by mounting the backwashing device adjustably on the supporting disk 19 and on the bearing disk 42.

As an additional characteristic feature, a plurality of channels, each extending along part of the length of the filter element, may be arranged in this backwashing device. These channels are arranged to be offset in the circumferential direction as well as in the axial direction of the filter element and provide a higher stability of the wall 33 so that there is no need for the supports described above.

As illustrated in FIGS. 3 and 4, in the vicinity of the opening 29, the resilient tongues are moved out of their normal position and shifted to an open position. Thus, the dirt can be removed from the gap area without any difficulty. The cleaned resilient tongues are returned again to their original position by means of the wall 33. As shown in FIGS. 3 and 4, the resilient tongues are oriented in the circumferential direction of the filter element.

In FIG. 5 another variant of resilient tongue is illustrated. These resilient tongues 29 can support themselves directly on the filter plate 11. For this purpose, the filter plate 11 is slightly slanted in each of the areas in which the resilient tongue would otherwise deflect through the plate, so that the free tip end of the resilient tongue catches on the slanted edge.

Figure 5A:
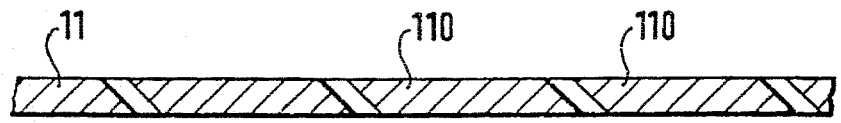
FIGS. 5a to c are sectional views and FIG. 5d is a plan view of individually supported resilient tongues.

FIG. 5a shows the basic position in which the resilient tongues 110 are at rest.

Figure 5B:
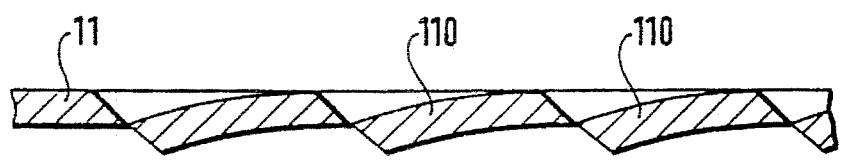

FIG. 5b shows the position during the operation; that is, during the filtering operation, in which case the unfiltered liquid flows downward. As a result of the pressure of the approaching unfiltered liquid, the resilient tongues move downward and their free tip ends come to rest against the slanted edges of the filter plate 11.

Figure 5C:
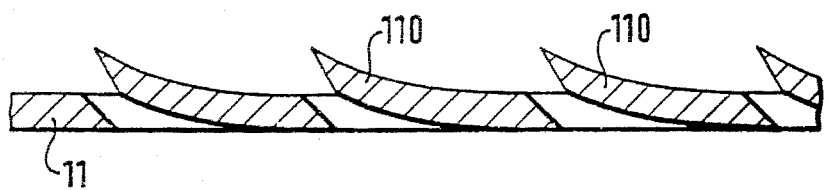

During backwashing, the tongues 110 move in accordance with FIG. 5c in the opposite direction, so that the slit-like openings are enlarged and particles which are caught in the filter gap can be removed without any difficulty.

Figure 5D:
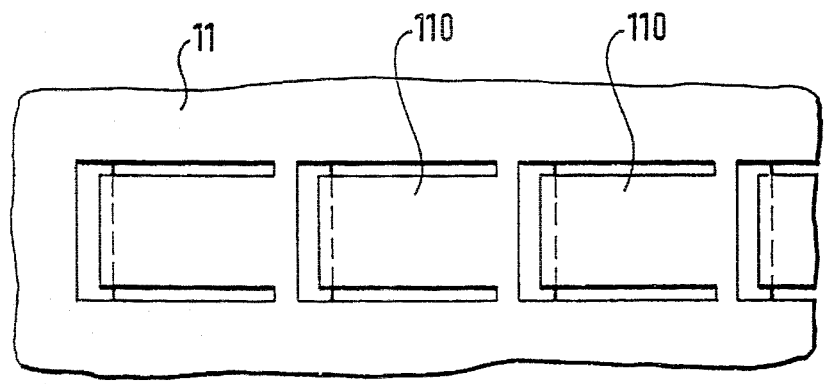

FIG. 5d is a plan view of the filter plate 11. Naturally, it is also possible to provide the filter plate with supporting nubs or similar devices instead of slanting the filter plate in the vicinity of the free tip ends of the resilient tongues. The important thing is that the filter plate 11 have a supporting effect in order to prevent the resilient tongues from deflecting through the plate. This self-supporting embodiment illustrated in FIG. 5 can be used advantageously where no supporting element is provided for plate 11 or where plate 11 is only supported at isolated points.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A backwashable fluid filter comprising a hollow-cylindrical filter element rotatable about its axis, through which a radial flow passes and which separates a filtrate chamber from a dirty-fluid chamber inside a filter housing, said filter being provided with a drive mechanism to rotate the cylindrical filter element about its axis and a stationary backwashing device arranged parallel to the axis of the filter element and comprising a dirt removal channel, said dirt removal channel being connected via a shut-off valve to a dirt discharge conduit, wherein said filter element comprises a plate provided with slit-shaped openings, each of said slit-shaped openings defining a resilient tongue, a resiliently mounted stripping device abutting said filter element and being arranged in front of the backwashing device for removing dirt situated on the surface of the filter element, and said dirt removal channel being provided with at least one opening which opens toward the surface of the filter element through which backwashing fluid can enter the dirt removal channel.

2. A filter according to claim 1, wherein said filter element is arranged on a supporting element which comprises a supporting basket, a profiled-wire winding or a perforated plate.

3. A filter according to claim 1, wherein said resilient tongue is oriented in the circumferential direction of the filter element.

4. A filter according to claim 1, wherein said at least one opening which opens toward the surface of the filter element is a slot which extends from end to end of the filter element parallel to the axis of the filter element.

5. A filter according to claim 4, wherein said slot is formed in an element which is mounted on a support member arranged behind the dirt removal channel.

6. A filter according to claim 1, wherein said stripping device comprises a sheet of spring steel attached to the backwashing device and having a contact surface which engages the surface of the filter element and extends parallel to the axis of the filter element.

7. A filter according to claim 6, wherein said sheet of spring steel is provided with a cutting edge which shears off fibers or dirt particles on the surface of the filter element.

8. A filter according to claim 1, wherein said stripping device is a wedge-shaped element on the backwashing device, said wedge-shaped element being resiliently biased radially against the filter element.

9. A filter according to claim 8, wherein said wedge-shaped element is mounted on the backwashing device, and the backwashing device is supported by a spring which urges the backwashing device toward the filter element.

10. A filter according to claim 1, wherein each of said slit-shaped openings has a substantially U-shaped configuration.

11. A filter according to claim 10, wherein each resilient tongue has a width which decreases from its free tip end to its root end.

12. A filter according to claim 10, wherein each resilient tongue is supported by a nub or a supporting surface on said filter element.

13. A filter according to claim 1, wherein said resilient tongue has a free tip portion located opposite an end of the resilient tongue connected to the plate, and wherein the slit-shaped openings define means such that:

during a filtering operation, the free tip portion of the resilient tongue moves toward a supporting surface of the plate to narrow or close the slit-shaped opening adjacent the free tip portion; and during a backwashing operation, the free tip portion of the resilient tongue moves away from said supporting surface to enlarge the slit-shaped opening adjacent the free tip portion.

14. A filter according to claim 13, wherein said supporting surface is a slanted edge which extends through the filter plate.

15. A filter according to claim 1, wherein said slit-shaped openings are cut in said filter element by means of a laser beam.

16. A filter according to claim 1, wherein said slit-shaped openings are formed in said filter element by means of etching.

* * * * *